United States Patent
Lauer

(10) Patent No.: US 8,457,627 B2
(45) Date of Patent: Jun. 4, 2013

(54) TRAFFIC SCHEDULING SYSTEM FOR WIRELESS COMMUNICATIONS

(75) Inventor: Bryan A. Lauer, Hinckley, IL (US)

(73) Assignee: GoGo LLC, Itasca, IL (US)

( * ) Notice: Subject to any disclaimer, the term of this patent is extended or adjusted under 35 U.S.C. 154(b) by 0 days.

(21) Appl. No.: 13/009,579

(22) Filed: Jan. 19, 2011

(65) Prior Publication Data

US 2011/0116373 A1    May 19, 2011

(51) Int. Cl.
*H04B 7/06* (2006.01)
*H04W 72/04* (2009.01)

(52) U.S. Cl.
USPC .......................................... 455/431; 455/450

(58) Field of Classification Search
USPC .................. 709/231, 224, 235, 241; 370/537, 370/56.2, 407, 395.64, 493, 328, 441, 252, 370/412, 232, 254, 238, 390, 401; 375/285, 375/219, 225; 455/553.1, 450, 445
See application file for complete search history.

(56) References Cited

U.S. PATENT DOCUMENTS

| | | |
|---|---|---|
| 3,659,085 A | 4/1972 | Potter et al. |
| 4,115,777 A | 9/1978 | Taylor |
| 4,654,867 A | 3/1987 | Labedz et al. |
| 5,042,027 A | 8/1991 | Takase et al. |
| 5,123,112 A | 6/1992 | Choate |
| 5,134,709 A | 7/1992 | Bi et al. |
| 5,212,804 A | 5/1993 | Choate |
| 5,408,515 A | 4/1995 | Bhagat et al. |
| 5,432,841 A | 7/1995 | Rimer |
| 5,459,469 A | 10/1995 | Schuchman et al. |
| 5,519,761 A | 5/1996 | Gilhousen |
| 5,543,779 A | 8/1996 | Aspesi et al. |
| 5,555,444 A | 9/1996 | Diekelman et al. |
| 5,590,395 A | 12/1996 | Diekelman |
| 5,651,050 A | 7/1997 | Bhagat et al. |
| 5,659,304 A | 8/1997 | Chakraborty |
| 5,678,174 A | 10/1997 | Tayloe |

(Continued)

FOREIGN PATENT DOCUMENTS

| | | |
|---|---|---|
| WO | WO-0146822 A1 | 6/2001 |
| WO | WO-2006128946 A1 | 12/2006 |
| WO | WO-2008048742 A1 | 4/2008 |

OTHER PUBLICATIONS

In the US Patent and Trademark Office in re: U.S. Appl. No. 07/847,920, Final Office Action dated Aug. 22, 1995, Number of pages unknown.

(Continued)

*Primary Examiner* — Kiet Doan
(74) *Attorney, Agent, or Firm* — Patton Boggs LLP

(57) ABSTRACT

The Traffic Scheduling System executes a multi-step process first to identify the bandwidth intensive traffic. The identification of the bandwidth intensive traffic is effected at the stream level by measuring the byte volume of the stream over a predetermined period of time and using this data to classify the stream into one of a plurality of usage categories. The classification of bandwidth intensive traffic is network neutral in that all data is classified at the stream level (source IP, destination IP, source port, destination port). Otherwise, the data is not inspected. Once streams have been classified by the Traffic Scheduling System, the Bandwidth Intensive and Near Real Time traffic can be controlled by a simple Traffic Shaping process executed by the Traffic Scheduling System, using a traffic management parameter such as via the Round-Trip Time of the next higher priority queue, in the set of queues.

18 Claims, 11 Drawing Sheets

U.S. PATENT DOCUMENTS

| | | | |
|---|---|---|---|
| 5,740,535 A | 4/1998 | Rune | |
| 5,754,959 A | 5/1998 | Ueno et al. | |
| 5,805,683 A | 9/1998 | Berberich, Jr. | |
| 5,826,188 A | 10/1998 | Tayloe et al. | |
| 5,832,380 A | 11/1998 | Ray et al. | |
| 5,848,359 A | 12/1998 | Furtaw | |
| 5,887,258 A | 3/1999 | Lemozit et al. | |
| 5,950,129 A | 9/1999 | Schmid et al. | |
| 5,956,644 A | 9/1999 | Miller et al. | |
| 5,970,395 A | 10/1999 | Weiler et al. | |
| 5,995,805 A | 11/1999 | Ogasawara et al. | |
| 5,995,833 A | 11/1999 | Zicker | |
| 6,002,944 A | 12/1999 | Beyda | |
| 6,009,330 A | 12/1999 | Kennedy, III et al. | |
| 6,040,781 A | 3/2000 | Murray | |
| 6,055,425 A | 4/2000 | Sinivaara | |
| 6,104,926 A | 8/2000 | Hogg et al. | |
| 6,144,338 A | 11/2000 | Davies | |
| 6,195,529 B1 | 2/2001 | Linz et al. | |
| 6,201,797 B1 | 3/2001 | Leuca et al. | |
| 6,233,448 B1 | 5/2001 | Alperovich et al. | |
| 6,263,206 B1 | 7/2001 | Potochniak et al. | |
| 6,263,371 B1 * | 7/2001 | Geagan et al. | 709/231 |
| 6,304,762 B1 | 10/2001 | Myers et al. | |
| 6,314,286 B1 | 11/2001 | Zicker | |
| 6,317,435 B1 * | 11/2001 | Tiedemann et al. | 370/441 |
| 6,321,084 B1 | 11/2001 | Horrer | |
| 6,324,398 B1 | 11/2001 | Lanzerotti et al. | |
| 6,353,734 B1 | 3/2002 | Wright et al. | |
| 6,392,692 B1 | 5/2002 | Monroe | |
| 6,393,281 B1 | 5/2002 | Capone et al. | |
| 6,418,327 B1 | 7/2002 | Carey et al. | |
| 6,430,412 B1 | 8/2002 | Hogg et al. | |
| 6,519,266 B1 | 2/2003 | Manning et al. | |
| 6,545,601 B1 | 4/2003 | Monroe | |
| 6,546,426 B1 * | 4/2003 | Post | 709/231 |
| 6,567,408 B1 | 5/2003 | Li et al. | |
| 6,570,851 B1 | 5/2003 | Koskelainen et al. | |
| 6,577,419 B1 | 6/2003 | Hall et al. | |
| 6,580,915 B1 | 6/2003 | Kroll | |
| 6,614,774 B1 | 9/2003 | Wang | |
| 6,615,052 B1 | 9/2003 | Parmenter | |
| 6,643,496 B1 | 11/2003 | Shimoyama et al. | |
| 6,690,928 B1 | 2/2004 | Konishi et al. | |
| 6,700,902 B1 | 3/2004 | Meyer | |
| 6,735,438 B1 | 5/2004 | Sabatino | |
| 6,735,500 B2 | 5/2004 | Nicholas et al. | |
| 6,741,841 B1 | 5/2004 | Mitchell | |
| 6,754,489 B1 | 6/2004 | Roux | |
| 6,757,712 B1 | 6/2004 | Bastian et al. | |
| 6,760,778 B1 | 7/2004 | Nelson et al. | |
| 6,788,935 B1 | 9/2004 | McKenna et al. | |
| 6,795,408 B1 | 9/2004 | Hiett | |
| 6,799,037 B1 | 9/2004 | Mielke et al. | |
| 6,810,527 B1 | 10/2004 | Conrad et al. | |
| 6,880,750 B2 | 4/2005 | Pentel | |
| 6,889,042 B2 | 5/2005 | Rousseau et al. | |
| 6,910,628 B1 | 6/2005 | Sehr | |
| 6,937,597 B1 | 8/2005 | Rosenberg et al. | |
| 6,944,169 B1 * | 9/2005 | Yoshizawa et al. | 370/410 |
| 6,948,003 B1 | 9/2005 | Newman et al. | |
| 6,963,292 B1 | 11/2005 | White | |
| 7,003,293 B2 | 2/2006 | D'Annunzio | |
| 7,027,801 B1 | 4/2006 | Hall et al. | |
| 7,050,755 B2 | 5/2006 | Kline | |
| 7,062,268 B2 | 6/2006 | McKenna | |
| 7,107,062 B2 | 9/2006 | Cruz et al. | |
| 7,131,136 B2 | 10/2006 | Monroe | |
| 7,280,535 B1 | 10/2007 | Bergman et al. | |
| 7,346,677 B1 | 3/2008 | Mohaban et al. | |
| RE40,476 E | 9/2008 | Leuca et al. | |
| 7,433,836 B1 | 10/2008 | August et al. | |
| 7,447,804 B2 | 11/2008 | Koo | |
| 7,486,690 B2 | 2/2009 | Maeda | |
| 7,526,762 B1 | 4/2009 | Astala et al. | |
| 7,599,691 B1 | 10/2009 | Mitchell | |
| 8,060,083 B2 | 11/2011 | Malosh | |
| 2002/0010633 A1 | 1/2002 | Brotherston | |
| 2002/0045444 A1 | 4/2002 | Usher et al. | |
| 2002/0059614 A1 | 5/2002 | Lipsanen et al. | |
| 2002/0082912 A1 | 6/2002 | Batachia et al. | |
| 2002/0090931 A1 | 7/2002 | Papineau et al. | |
| 2002/0123344 A1 | 9/2002 | Criqui et al. | |
| 2002/0155833 A1 | 10/2002 | Borel | |
| 2003/0032426 A1 | 2/2003 | Gilbert et al. | |
| 2003/0046118 A1 | 3/2003 | O'Donnell | |
| 2003/0046701 A1 | 3/2003 | O'Donnell | |
| 2003/0050746 A1 | 3/2003 | Baiada et al. | |
| 2003/0055975 A1 | 3/2003 | Nelson et al. | |
| 2003/0084108 A1 | 5/2003 | Syed | |
| 2003/0093187 A1 | 5/2003 | Walker | |
| 2003/0100315 A1 | 5/2003 | Rankin | |
| 2003/0103521 A1 | 6/2003 | Raphaeli et al. | |
| 2003/0109245 A1 | 6/2003 | McCalmont et al. | |
| 2004/0063433 A1 | 4/2004 | Garrison | |
| 2004/0102188 A1 | 5/2004 | Boyer et al. | |
| 2004/0137840 A1 | 7/2004 | La Chapelle et al. | |
| 2004/0142658 A1 | 7/2004 | McKenna et al. | |
| 2004/0152446 A1 | 8/2004 | Saunders et al. | |
| 2004/0203918 A1 | 10/2004 | Moriguchi et al. | |
| 2005/0053026 A1 | 3/2005 | Mullan et al. | |
| 2005/0071076 A1 | 3/2005 | Baiada et al. | |
| 2005/0216938 A1 | 9/2005 | Brady et al. | |
| 2005/0220055 A1 | 10/2005 | Nelson et al. | |
| 2005/0221875 A1 | 10/2005 | Grossman et al. | |
| 2006/0009262 A1 | 1/2006 | Hamm | |
| 2006/0048196 A1 | 3/2006 | Yau | |
| 2006/0064746 A1 | 3/2006 | Aaron et al. | |
| 2006/0229070 A1 | 10/2006 | de La Chapelle et al. | |
| 2007/0021117 A1 | 1/2007 | McKenna et al. | |
| 2007/0042772 A1 | 2/2007 | Salkini et al. | |
| 2007/0064604 A1 | 3/2007 | Chen et al. | |
| 2007/0087756 A1 | 4/2007 | Hoffberg | |
| 2007/0105600 A1 | 5/2007 | Mohanty et al. | |
| 2007/0111725 A1 | 5/2007 | Kauffman et al. | |
| 2007/0161347 A1 | 7/2007 | Ma et al. | |
| 2007/0274294 A1 | 11/2007 | Sasaki et al. | |
| 2007/0281682 A1 | 12/2007 | Raju et al. | |
| 2008/0039076 A1 | 2/2008 | Ziarno et al. | |
| 2008/0070601 A1 | 3/2008 | Brueckheimer et al. | |
| 2008/0090546 A1 | 4/2008 | Dickinson et al. | |
| 2009/0016339 A1 | 1/2009 | Tanizawa et al. | |
| 2009/0080368 A1 | 3/2009 | Bengeult et al. | |

OTHER PUBLICATIONS

In the US Patent and Trademark Office in re: U.S. Appl. No. 07/847,920, Final Office Action dated Mar. 21, 1996.
In the US Patent and Trademark Office in re: U.S. Appl. No. 07/847,920, Non-Final Office Action dated Feb. 27, 1995.
In the US Patent and Trademark Office in re: U.S. Appl. No. 07/847,920, Non-Final Office Action dated Jan. 27, 1994.
In the US Patent and Trademark Office in re: U.S. Appl. No. 07/847,920, Non-Final Office Action dated Jul. 30, 1993.
In the US Patent and Trademark Office in re: U.S. Appl. No. 08/027,333, Non-Final Office Action dated Jun. 24, 1994.
In the US Patent and Trademark Office in re: U.S. Appl. No. 08/709,417, Final Office Action dated Jun. 11, 1998.
In the US Patent and Trademark Office in re: U.S. Appl. No. 08/709,417, Non-Final Office Action dated Feb. 18, 1998.
In the US Patent and Trademark Office in re: U.S. Appl. No. 08/960,183, Non-Final Office Action dated Nov. 5, 1999.
In the US Patent and Trademark Office in re: U.S. Appl. No. 09/379,825, Non-Final Office Action dated May 11, 2001.
In the US Patent and Trademark Office in re: U.S. Appl. No. 09/686,923, Final Office Action dated Dec. 2, 2003.
In the US Patent and Trademark Office in re: U.S. Appl. No. 09/686,923, Non-Final Office Action dated Jul. 8, 2003.
In the US Patent and Trademark Office in re: U.S. Appl. No. 10/730,329, Final Office Action dated Nov. 25, 2005, 16 pages.
In the US Patent and Trademark Office in re: U.S. Appl. No. 10/730,329, Non-Final Office Action dated May 18, 2005, 9 pages.
In the US Patent and Trademark Office in re: U.S. Appl. No. 11/414,873, Non-Final Office Action dated Oct. 15, 2009, 7 pages.

In the US Patent and Trademark Office in re: U.S. Appl. No. 11/492,545, Final Office Action dated Dec. 19, 2008, 18 pages.
In the US Patent and Trademark Office in re: U.S. Appl. No. 11/492,545, Final Office Action dated Nov. 19, 2009, 19 pages.
In the US Patent and Trademark Office in re: U.S. Appl. No. 11/492,545, Non-Final Office Action dated Aug. 7, 2008, 19 pages.
In the US Patent and Trademark Office in re: U.S. Appl. No. 11/492,545, Non-Final Office Action dated Jun. 10, 2009, 20 pages.
In the US Patent and Trademark Office in re: U.S. Appl. No. 11/590,146, Final Office Action dated Mar. 15, 2010, 18 pages.
In the US Patent and Trademark Office in re: U.S. Appl. No. 11/590,146, Final Office Action dated Mar. 31, 2009, 9 pages.
In the US Patent and Trademark Office in re: U.S. Appl. No. 11/590,146, Non-Final Office Action dated Sep. 15, 2009, 16 pages.
In the US Patent and Trademark Office in re: U.S. Appl. No. 11/590,146, Non-Final Office Action dated Sep. 24, 2008, 12 pages.
In the US Patent and Trademark Office in re: U.S. Appl. No. 12/021,125, Non-Final Office Action dated Jun. 10, 2010, 12 pages.
In the US Patent and Trademark Office in re: U.S. Appl. No. 12/021,133, Non-Final Office Action dated Jun. 18, 2009, 14 pages.
In the US Patent and Trademark Office in re: U.S. Appl. No. 12/021,169, Final Office Action dated Apr. 21, 2011, 12 pages.
In the US Patent and Trademark Office in re: U.S. Appl. No. 12/021,169, Final Office Action dated Jun. 8, 2010, 8 pages.
In the US Patent and Trademark Office in re: U.S. Appl. No. 12/021,169, Non-Final Office Action dated Jan. 15, 2010, 8 pages.
In the US Patent and Trademark Office in re: U.S. Appl. No. 12/021,169, Non-Final Office Action dated Jul. 14, 2009, 10 pages.
In the US Patent and Trademark Office in re: U.S. Appl. No. 12/021,169, Non-Final Office Action dated Nov. 10, 2010, 10 pages.
In the US Patent and Trademark Office in re: U.S. Appl. No. 12/029,298, Final Office Action dated Nov. 23, 2010, 11 pages.
In the US Patent and Trademark Office in re: U.S. Appl. No. 12/029,298, Non-Final Office Action dated Jun. 22, 2010, 11 pages.
In the US Patent and Trademark Office in re: U.S. Appl. No. 12/060,645, Final Office Action dated Apr. 4, 2011, 13 pages.
In the US Patent and Trademark Office in re: U.S. Appl. No. 12/060,645, Non-Final Office Action dated Nov. 3, 2010, 19 pages.
In the US Patent and Trademark Office in re: U.S. Appl. No. 12/060,662, Final Office Action dated Apr. 4, 2011, 20 pages.
In the US Patent and Trademark Office in re: U.S. Appl. No. 12/060,662, Non-Final Office Action dated Nov. 18, 2010, 26 pages.
In the US Patent and Trademark Office in re: U.S. Appl. No. 12/060,674, Final Office Action dated Apr. 5, 2011, 19 pages.
In the US Patent and Trademark Office in re: U.S. Appl. No. 12/060,674, Final Office Action dated Jan. 15, 2010, 11 pages.
In the US Patent and Trademark Office in re: U.S. Appl. No. 12/060,674, Non-Final Office Action dated Jul. 9, 2009, 14 pages.
In the US Patent and Trademark Office in re: U.S. Appl. No. 12/060,674, Non-Final Office Action dated Nov. 22, 2010, 13 pages.
In the US Patent and Trademark Office in re: U.S. Appl. No. 12/137,995, Final Office Action dated Nov. 30, 2011, 17 pages.
In the US Patent and Trademark Office in re: U.S. Appl. No. 12/137,995, Non-Final Office Action dated Jul. 27, 2011, 14 pages.
In the US Patent and Trademark Office in re: U.S. Appl. No. 12/182,834, Final Office Action dated Nov. 20, 2009, 8 pages.
In the US Patent and Trademark Office in re: U.S. Appl. No. 12/182,834, Non-Final Office Action dated Feb. 8, 2011, 8 pages.
In the US Patent and Trademark Office in re: U.S. Appl. No. 12/182,834, Non-Final Office Action dated Jul. 8, 2009, 13 pages.
In the US Patent and Trademark Office in re: U.S. Appl. No. 12/423,555, Final Office Action dated Mar. 24, 2010, 9 pages.
In the US Patent and Trademark Office in re: U.S. Appl. No. 12/423,555, Non-Final Office Action dated Nov. 10, 2009, 7 pages.
In the US Patent and Trademark Office in re: U.S. Appl. No. 13/227,634, Non-Final Office Action dated Nov. 29, 2011, 13 pages.
Casewell, I.E.; "The Provision of GSM Cellular Radio Environments With Passenger Aircraft Operating Over Europe"; IEEE Fifth International Conference; Dec. 11-14, 1989; pp. 172-176.
International Search Report issued Dec. 29, 2009 in co-pending application PCT/US09/036158.
International Search Report issued Jul. 17, 2009 in co-pending application PCT/US2009/042788.
International Search Report issued Nov. 6, 2009 in co-pending application PCT/US2009/036155.
Li et al.; "Airborne Operation of Portable Electronic Devices"; IEEE Antenna's and Propagation Magazine; vol. 44, No. 4; Aug. 2002; pp. 30-39.
Papavramidis et al.; "Adaptation of Land Mobile Systems for Onboard Operation"; IEEE Conference; 1993; pp. 258-263.
Uhlirz; "Concept of a GSM-based Communication System for High-Speed Trains"; 1994 IEEE 44th Vehicular Technology Conference; Stockholm; Jun. 8-10, 1994; pp. 1130-1134.
In the US Patent and Trademark Office in re: U.S. Appl. No. 13/009,687, Non-Final Office Action dated Feb. 22, 2012, 5 pages.
In the US Patent and Trademark Office in re: U.S. Appl. No. 13/224,564, Non-Final Office Action dated Apr. 2, 2012, 8 pages.
In the US Patent and Trademark Office in re: U.S. Appl. No. 13/227,634, Final Office Action dated Mar. 6, 2012, 7 pages.
International Search Report issued Mar. 21, 2012, in co-pending application PCT/US2011/068110, 3 pages.

* cited by examiner

| | Selected a Video to Watch | | |
|---|---|---|---|
| Clear Console HTML CSS Script DOM NET YSlow | | | |
| Clear All HTML CSS js XHR Images Flash | | | |
| ℹ Net panel activated. Any requests while the net panel is inactive are not shown. | | | |
| + GET watch?v=rs75vZduz60&fe | 200 OK | youtube.com | 26 KB |
| + GET watch-vn126580.swf | 200 OK | s.ytimg.com | 102 KB |
| + GET watch_header.jpg?v=4ac5 | 200 OK | i1.ytimg.com | 31 KB |
| + GET l.jpg?v=7830b6 | 200 OK | i.ytimg.com | 1 KB |
| + GET elolplore-popular_music_vi | 200 OK | s.ytimg.com | 203 B |
| + GET video_bar_arrows-vfl8447 | 200 OK | s.ytimg.com | 687 B |
| + GET default.jpg | 200 OK | i2.ytimg.com | 3 KB |
| + GET default.jpg | 200 OK | i3.ytimg.com | 3 KB |
| + GET default.jpg | 200 OK | i4.ytimg.com | 3 KB |
| + GET default.jpg | 200 OK | i2.ytimg.com | 3 KB |
| + GET watch-vfl126580.swf | 200 OK | s.ytimg.com | 102 KB |
| + GET videoplayback?ip=0.0.0.08 | | v2.lscache6.c.youtube.com | 26.41 MB |
| + GET get_video?video_id=rs75 | 204 No Content | youtube.com | ? |
| + GET s?ns=yt&docid=rs75vZdu | 204 No Content | video-stats.video.google.com | ? |
| + GET s?ns=yt&docid=rs75vZdu | 204 No Content | s2.youtube.com | ? |
| + GET s?ns=yt&docid=rs75vZdu | 204 No Content | s2.youtube.com | ? |
| Transferring data from v2.lscache6.c.youtube.com ... | | | |

Stream size

Smaller streams/objects are not the issue wrt link congestion

Large object/stream here is a video stream

FIG. 6

→ Embedded Video

| | | | |
|---|---|---|---|
| Clear | | | |
| + GET log?m=UH9yHyFWRFhkAQ | 200 OK | video.od.visiblemeasures.com | 11 B |
| + GET log?m=U5M2WGACdk8oUt | 200 OK | video.od.visiblemeasures.com | 11B |
| + GET DynamicVideoAd?srvc=szl | 200 OK | espn.vad.go.com | 4KB |
| + GET dm_091019_mlb_sc-philli | 200 OK | brsseavideo-ak.espn.go.com | 26.08 MB |
| + GET s09045389876700?AQB=1 | 200 OK | w88.go.com | 1 B |
| + GET s67967802574858?[AQB]8 | 200 OK | w88.go.com | 1 B |
| + GET m?ci=us-9003358&tl=dav0 | 200 OK | secure-us.imrworldwide.com | ? |
| + GET log?m=USM2WGACdkotV3 | 200 OK | video.od.visiblemeasures.com | 11 B |
| + GET quant.swf?publisherId=p | 200 OK | flash.quantserve.com | 4 KB |
| + GET log?m=U5M2WGACdloxXX | 200 OK | video.od.visiblemeasures.com | 11 B |

Large object here is a video stream

*FIG. 7*

TRAFFIC SCHEDULING SYSTEM FOR WIRELESS COMMUNICATIONS

CROSS-REFERENCE TO RELATED APPLICATIONS

This application is related to U.S. patent application Ser. No. 13/009,687 filed Jan. 19, 2011.

FIELD OF THE INVENTION

This Traffic Scheduling System For Air-To-Ground Communications relates to a system that controls the volume of Air-to-Ground traffic by maintaining multiple concurrent traffic flows and assigning individual passengers in the aircraft to a selected one of the traffic flows/classes of data in order to optimize or guarantee performance, low latency, and/or bandwidth.

BACKGROUND OF THE INVENTION

It is a problem in the field of wireless communications to manage the wireless services provided by an aircraft network to passengers who are located in the aircraft. The aircraft network serves a plurality of subscribers, yet has a link to the ground-based network via a wide bandwidth Air-To-Ground link that concurrently serves multiple individual subscribers. Each subscriber is associated with a one-to-one communication connection, which comprises a channel on the aircraft wireless network which is connected via an Air-To-Ground link to the ground-based network, to access the desired communication services.

When wireless subscribers enter the non-terrestrial communication network (that is, they fly in an aircraft as passengers), they encounter a unique environment that traditionally has been disconnected from the terrestrial cellular network, where the wireless network of the aircraft interfaces the subscriber (also termed "passenger" herein) to various services and content. The aircraft wireless network, therefore, can function as a content filter or can create unique types of content that are directed to the individual passengers who are onboard the aircraft. However, although the aircraft network serves a plurality of passengers, it has a link to the ground-based Access Network via a wide bandwidth radio frequency connection.

It is a problem to provide the passengers with quality communications when network-based or aircraft-based congestion occurs due to high bandwidth applications (e.g., http video downloads) being executed by passengers. High bandwidth applications disrupt near real time applications of other passengers and the overall usability of the Air-To-Ground communication service (Internet browsing, email connectivity, Virtual Private Network heartbeat, etc.). Volume Controls can help reduce high usage at relatively larger time scales (15 minutes), but these are largely ineffective with large subscriber count flights where the systemic congestion prevents volume control activation. In addition, presently available controls penalize the passenger instead of addressing the source of the problem, which is controlling the bandwidth intensive application. Network-based systems have difficulty in reliably identifying bandwidth intensive applications (SCE) and are always in a "catch up mode." Network controls and rate limits are also static and have no measure of current Air-To-Ground performance, since these controls are based on averages. Thus, there is a need to provide reliable communications for critical resources thereby to provide a quality user experience.

BRIEF SUMMARY OF THE INVENTION

The above-described problems are solved and a technical advance achieved in the field by the present Traffic Scheduling System For Air-To-Ground Communications (termed "Traffic Scheduling System" herein), which enables the assignment of individual Internet Protocol (IP) addresses to each of the passenger wireless devices operating in an aircraft and served by an airborne wireless cellular network, thereby to enable delivery of wireless services to the individually identified passenger wireless devices and to manage the various passenger traffic and classes of data to optimize or guarantee performance, low latency, and/or bandwidth.

The Traffic Scheduling System provides wireless communication services to passengers who are located onboard an aircraft by storing data indicative of the individually identified passenger wireless devices that are located onboard the aircraft. The Traffic Scheduling System assigns a single IP address to each Point-to-Point Protocol radio frequency link which connects the aircraft network to the ground-based Access Network, and also supports a plurality of IP addresses for the passenger wireless devices served by each of the Air-To-Ground radio frequency links thereby to enable each passenger wireless device to be uniquely identified with their own IP address. The Network Address Translation onboard the aircraft can utilize a greater number of IP addresses than one per link by the use of the Traffic Scheduling System.

The electronic services that are provided to the passenger include Internet, in-flight entertainment services, such as multi-media presentations, as well as destination-based services, which link the passenger's existing travel plans with offers for additional services that are available to the passenger at their nominal destination and their planned travel schedule, and optionally, voice services. The passenger thereby is presented with opportunities during their flight to enhance their travel experience, both in-flight and at their destination, by accessing the various services. The individual identification of each passenger wireless device simplifies the provision of these services and enables the customization of these services based upon predefined profiles created for the passenger. However, these various types of data require different types of management to ensure passenger satisfaction with the service. The Traffic Scheduling System manages the various passenger traffic and classes of data to optimize or guarantee performance, low latency, and/or bandwidth. Thus, each passenger's data is grouped with like data from other passengers into predetermined traffic flows in order to facilitate the management of the level of service provided to each class of data. The level of service provided for a class of data is commensurate with the nature of the data, the expectations of the passengers, and the capacity of the Air-To-Ground link.

This is accomplished by the Traffic Scheduling System executing a multi-step process to first identify the bandwidth intensive traffic. The identification of the bandwidth intensive traffic is effected at the stream level by measuring the byte volume of the stream and using this data to classify the stream into one of a plurality of usage categories. The classification of bandwidth intensive traffic extant in the aircraft is network neutral in that all data is classified at the stream level (source IP, destination IP, source port, destination port). Otherwise, the data is not inspected. The stream is deemed Bandwidth Intensive if it exceeds some byte volume, and the streams deemed Bandwidth Intensive then are controlled at the Aircraft Network Controller using Dynamic Configuration.

BRIEF DESCRIPTION OF THE DRAWINGS

FIGS. 6 and 7 illustrate screen shots of typical data file transfer activity as monitored by the Traffic Scheduling System;

DETAILED DESCRIPTION OF THE INVENTION

Overall System Architecture

Figure 1:
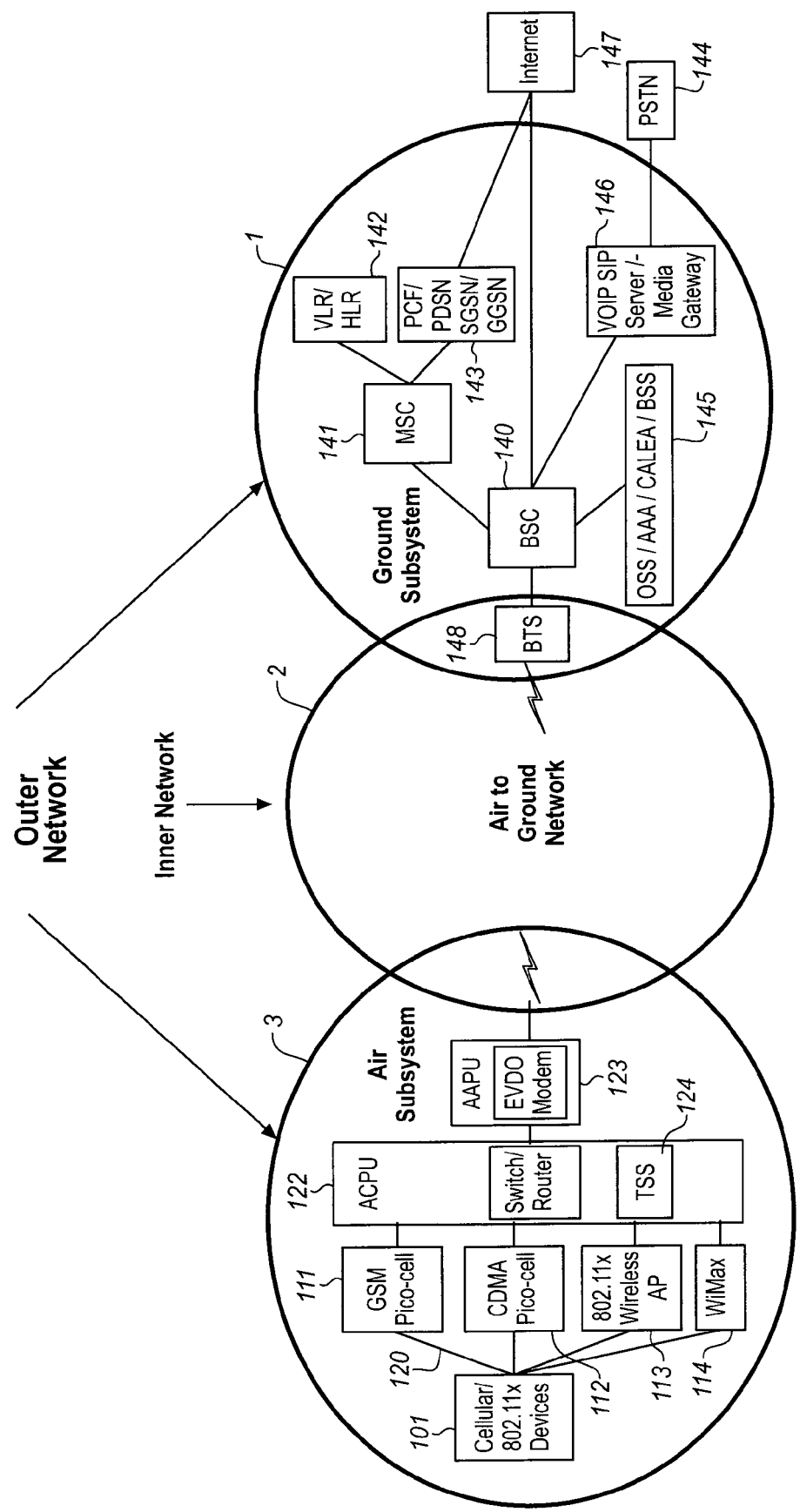
FIG. 1 illustrates, in block diagram form, the overall architecture of a composite Air-To-Ground network that interconnects an Air Subsystem with a Ground-Based Access Network.

FIG. 1 illustrates, in block diagram form, the overall architecture of the non-terrestrial communication network, which includes an Air-To-Ground Network 2 (Inner Network) that interconnects the two elements of an Outer Network, comprising an Air Subsystem 3 and Ground Subsystem 1. This diagram illustrates the basic concepts of the non-terrestrial communication network and, for the purpose of simplicity of illustration, does not comprise all of the elements found in a typical non-terrestrial communication network. The fundamental elements disclosed in FIG. 1 provide a teaching of the interrelationship of the various elements which are used to implement a non-terrestrial communication network to provide content to passenger wireless devices which are located in an aircraft. This is accomplished by the Air-To-Ground Network 2 transmitting both the passenger communication traffic (comprising voice and/or other data) and control information between the Air Subsystem 3 and the Ground Subsystem 1 thereby to enable the passenger wireless devices that are located in the aircraft to receive communication services in the aircraft.

Air Subsystem

The "Air Subsystem" is the communications environment that is implemented in the aircraft; and these communications can be based on various technologies, including, but not limited to: wired, wireless, optical, acoustic (ultrasonic), and the like. An example of such a network is disclosed in U.S. Pat. No. 6,788,935, titled "Aircraft-Based Network For Wireless Subscriber Stations".

The preferred embodiment for the Air Subsystem 3 is the use of wireless technology and for the wireless technology to be native to passenger wireless devices that passengers and crew carry on the aircraft. Thus, a laptop computer can communicate via a WiFi or WiMax wireless mode (or via a wired connection, such as a LAN). Optionally, voice service can be provided where a PDA could communicate telephony voice traffic via VoIP (Voice over IP). Likewise, a handheld cell phone that uses the GSM protocol communicates via GSM, and a CDMA cell phone would use CDMA when inside the aircraft to connect to the Air Subsystem 3. The connection states could be packet-switched or circuit-switched or both. Overall, the objective on the Air Subsystem 3 is to enable seamless and ubiquitous access to the Air Subsystem 3 for passenger wireless devices that are carried by passengers and crew, regardless of the technology used by these passenger wireless devices.

The Air Subsystem 3 also provides the mechanism to manage the provision of services to the passenger wireless devices that are operating in the aircraft cabin. This management includes not only providing the passenger traffic connectivity but also the availability of non-terrestrial specific feature sets which each passenger is authorized to receive. These features include in-flight entertainment services, such as multi-media presentations, as well as destination-based services which link the passenger's existing travel plans with offers for additional services that are available to the passenger at their nominal destination and their planned travel schedule. The passenger thereby is presented with opportunities during their flight to enhance their travel experience, both in-flight and at their destination.

The passenger wireless devices 101 used in the aircraft can be identical to those used on the cellular/PCS ground-based communication network; however, these passenger wireless devices 101 are pre-registered with the carrier serving the aircraft and/or users have PIN numbers for authentication. In addition, an antenna interconnects the passenger wireless devices 101 with the in-cabin Base Transceiver Stations (BTS) 111-114, which are typically pico-cells with BSC/MSC functions integrated. BTS/BSC/MSC modules are added for each air-interface technology supported. The Airborne Control Processor Unit (ACPU) 122 and Air-To-Ground Airborne Communications Unit (AACU) 123, including a Modem, acts as the bridging function (for media/content and signaling to a limited extent) between the Air Subsystem 3 and the ground-based Access Network 1, since the Airborne Control Processor Unit (ACPU) 122 places a call using the Modem to the ground-based Access Network 1 via the Air-To-Ground Network 2. Airborne Control Processor Unit (ACPU) 122 converts the individual traffic and signaling channels from the base stations to/from an aggregate data stream, and transmits/receives the aggregate data streams over the Air-To-Ground Network 2 which maintains continuous service as the aircraft travels. The Modem includes radio transmission equipment and antenna systems to communicate with ground-based transceivers in the ground-based portion of the Air-To-Ground Network 2. The individual traffic channels assigned on the Air-To-Ground Network 2 are activated based upon the traffic demand to be supported from the aircraft.

Air-To-Ground Network

The Air-To-Ground Network 2 shown in FIG. 1 is clearly one that is based on wireless communications (radio frequency or optical) between the Ground Subsystem 1 and the Air Subsystem 3 which serves the passenger wireless devices that are located in the aircraft, with the preferred approach being that of a radio frequency connection. This radio frequency connection typically takes on the form of a cellular topology where typically more than one cell describes the geographic footprint or coverage area of the composite Air-To-Ground Network 2. The Air-To Ground connection carries both passenger communications traffic and native network signaling traffic. In the preferred embodiment, the Air-To-Ground Network 2 transports all traffic to/from the aircraft in a single, aggregated communication channel. This "single pipe" has distinct advantages in terms of managing hard and soft handoffs as the aircraft transitions between one ground-based cell to the next. This approach also takes advantage of newer, higher speed wireless cellular technologies.

Alternatively, the Air-To-Ground Network 2 could be achieved through a wireless satellite connection where radio frequency links are established between the aircraft and a satellite and between the satellite and the Ground Subsystem 1, respectively. These satellites could be geosynchronous (appears to be stationary from an earth reference point) or moving, as is the case for Medium Earth Orbit (MEO) and Low Earth Orbit (LEO). Examples of satellites include, but are not limited to: Geosynchronous Ku Band satellites, DBS satellites (Direct Broadcast Satellite), the Iridium system, the Globalstar system, and the Inmarsat system. In the case of specialized satellites, such as those used for Direct Broadcast Satellite, the link typically is unidirectional, that is, from the satellite to the receiving platform, in this case an aircraft. In such a system, a link transmitting unidirectionally from the aircraft is needed to make the communication bidirectional. This link could be satellite or ground-based wireless in nature as previously described. Lastly, other means for communicating with an aircraft include broad or wide area links such as High Frequency (HF) radio and more unique systems such as troposcatter architectures.

The Air-To-Ground Network 2 can be viewed as the conduit through which the passenger communications traffic, as well as the control and network feature set data, is transported between the Ground Subsystem 1 and the Air Subsystem 3. The Air-To-Ground Network 2 can be implemented as a single radio frequency link or multiple radio frequency links, with a portion of the signals being routed over different types of links, such as the Air-To-Ground Link and the Satellite Link. Thus, there is a significant amount of flexibility in the implementation of this system, using the various components and architectural concepts disclosed herein in various combinations.

Ground Subsystem

The Ground Subsystem 1 consists of Base Station Controller 140 which connects the voice traffic of the Air-To-Ground Network 2 with traditional cellular communication network elements, including a Mobile Switching Center 141 and its associated Visited Location Register, Home Location Register 142, to interconnect the voice traffic to the Public Switched Telephone Network 144, and other such functionalities. In addition, the Mobile Switching Center 141 is connected to the Internet 147 via Public Switched Data Network (PSDN) 143 for call completions. Base Station Controller 140 also provides interconnection of the data traffic to the Internet 147, Public Switched Telephone Network 144 via Voice over IP Server 146, and other such functionalities. These other functionalities include the Authentication Server, Operating Subsystems, CALEA, and BSS servers 145.

Thus, the communications between the passenger wireless devices 101 located in an aircraft and the Ground Subsystem 1 of the ground-based communication network are transported via the Air Subsystem 3 and the Air-To-Ground Network 2 to the ground-based Base Station Controller 140 of the non-terrestrial cellular communication network. The enhanced functionality described below and provided by the Air Subsystem 3, the Air-To-Ground Network 2, and the ground-based Base Station Controller 140 renders the provision of services to the passenger wireless devices 101 located in an aircraft transparent to the passengers. The Radio Access Network (RAN) supports communications from multiple aircraft and may employ a single omni-directional signal, or may employ multiple spatial sectors which may be defined in terms of azimuth and/or elevation angles. Aircraft networks hand over the Point-to-Point communication links between Radio Access Networks (RAN) in different locations (different Ground Subsystems 1) in order to maintain continuity of service on Air-To-Ground Network 2. Handovers may be hard or soft, or may be a combination of hard and soft on the Air-To-Ground and Ground-To-Air links.

The Mobile Switching Center 141 provides mobility management for all airborne systems and provides handover management between ground stations as an airborne system moves between the service areas of adjoining Ground Subsystems 1. The Base Station Controller 140 interfaces all traffic to/from the associated Base Transceiver Subsystem (BTS) 148. The Packet Data Serving Node (PDSN) controls assignment of capacity of each of the Base Transceiver Subsystems 148 among the airborne systems within their respective service areas.

Typical Aircraft-Based Network

Figure 2:
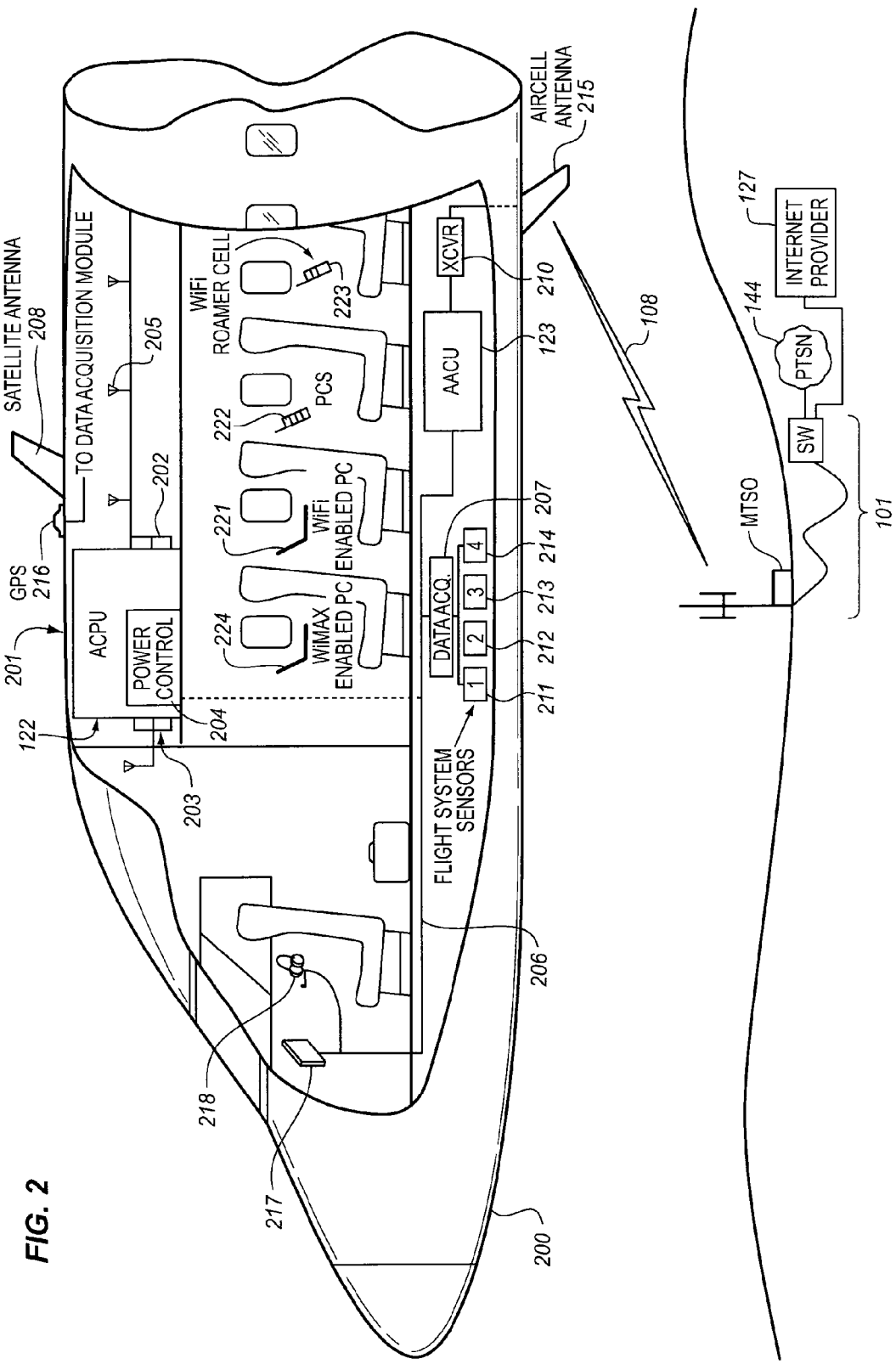
FIG. 2 illustrates, in block diagram form, the architecture of a typical embodiment of a typical aircraft-based network for passenger wireless devices as embodied in a multi-passenger commercial aircraft.

FIG. 2 illustrates the architecture of a typical aircraft-based network for passenger wireless devices as embodied in a multi-passenger commercial aircraft 200. This system comprises a plurality of elements used to implement a communication backbone that enables wireless communication for a plurality of wireless communication devices of diverse nature. The aircraft-based network for passenger wireless devices includes a Local Area Network 206 that implements a radio frequency communication system that uses a spread spectrum paradigm and has a short range of operation. This Local Area Network 206 supports both circuit-switched and packet-switched connections from passenger wireless devices 221-224 and interconnects the communications of these passenger wireless devices 221-224 via a gateway transceiver or transceivers 210 to the Public Switched Telephone Network (PSTN) 144 and other destinations, such as the Internet 147 or Public Data Switched Network (PDSN). The wireless passengers thereby retain their single number identity as if they were directly connected to the Public Switched Telephone Network 144. The passenger wireless devices 221-224 include a diversity of communication devices, such as laptop computers 221, cellular telephones 222, MP3 music players (not shown), Personal Digital Assistants (PDA) (not shown), WiFi-based devices 223, WiMax-based devices 224, and the like, and for simplicity of description are all collectively termed "passenger wireless devices" herein, regardless of their implementation-specific details.

The basic elements of the aircraft-based network for passenger wireless devices comprises at least one antenna 205 or means of coupling electromagnetic energy to/from the Air Subsystem 3 located within the aircraft 200 which serves to communicate with the plurality of passenger wireless devices 221-224 located within the aircraft 200. The at least one antenna 205 is connected to Airborne Control Processor Unit (ACPU) 122 that encompasses a plurality of elements that serve to regulate the wireless communications with the plurality of passenger wireless devices 221-224. The Airborne Control Processor Unit (ACPU) 122 includes a low power radio frequency transceiver 203 for providing a data-based packet-switched communication space using a wireless communication paradigm, such as WiFi 113/114 (which could also convey packet-switched Voice over Internet Protocol (VoIP)). In addition, the Airborne Control Processor Unit (ACPU) 122 can optionally include at least one low power radio frequency transceiver 202 for providing a circuit-switched communication space using a wireless communication paradigm, such as PCS, CDMA 110, or GSM 111, for example.

Finally, Airborne Control Processor Unit (ACPU) 122 includes a power control segment 204 that serves to regulate the power output of the plurality of passenger wireless devices. It also serves, by RF noise or jamming apparatus, to prevent In-Cabin passenger wireless devices from directly and errantly accessing the ground network when in a non-terrestrial mode. The ultra-low airborne transmit power level feature represents a control by the Power Control element 204 of Airborne Control Processor Unit (ACPU) 122 of the aircraft-based network for passenger wireless devices to regulate the output signal power produced by the passenger wireless devices 221-224 to minimize the likelihood of receipt of a cellular signal by ground-based cell sites or ground-based passenger wireless devices.

It is obvious that these above-noted segments of Airborne Control Processor Unit (ACPU) 122 can be combined or parsed in various ways to produce an implementation that differs from that disclosed herein. The particular implementation described is selected for the purpose of illustrating the concept of the invention and is not intended to limit the applicability of this concept to other implementations.

The Airborne Control Processor Unit (ACPU) 122 is connected to a plurality of other elements which serve to provide services to the passenger wireless devices 221-224. These other elements can include an Air-To-Ground Airborne Communications Unit (AACU) 123 for providing management, switching, routing, and aggregation functions for the communication transmissions of the passenger wireless devices. A data acquisition element 207 serves to interface with a plurality of flight system sensors 211-214 and a Global Positioning System element 216 to collect data from a plurality of sources as described below. Furthermore, pilot communication devices, such as the display 217 and headset 218, are connected to this Local Area Network either via a wired connection or a wireless connection.

Finally, a gateway transceiver(s) 210 is used to interconnect the Air-To-Ground Airborne Communications Unit (AACU) 123 to an antenna 208, 215 to enable signals to be transmitted from the aircraft-based network for passenger wireless devices to transceivers located on the ground. Included in these components is a communications router function to forward the communication signals to the proper destinations. Thus, signals that are destined for passengers on the aircraft are routed to these individuals, while signals routed to passengers located, for example, on the ground are routed to the Ground Subsystem. Aircraft antenna patterns that typically minimize nadir (Earth directed) effective radiated power (ERP) may be used in the implementation of the antenna(s) 215 on the aircraft to serve the aircraft-based network for passenger wireless devices or are directed to a satellite via antenna 208.

Passenger Login For System Access

On each aircraft, the passenger access to electronic communications typically is regulated via a passenger wireless device registration process, where each electronic device must be identified, authenticated, and authorized to receive service. Since the aircraft is a self-contained environment with respect to the wireless communications between the passenger wireless devices and the airborne wireless network extant in the aircraft, all communications are regulated by the network controller. Thus, when a passenger activates their passenger wireless device, a communication session is initiated between the passenger wireless device and the network controller to identify the type of device the passenger is using and, thus, its wireless protocol. A "splash screen" is delivered to the passenger on the passenger wireless device to announce entry into the wireless network portal. Once this is established, the network controller transmits a set of login displays to the passenger wireless device to enable the passenger to identify themselves and validate their identity (if the passenger wireless device is not equipped to automatically perform these tasks via a smart client which automatically logs the passenger into the network). As a result of this process, the passenger wireless device is provided with a unique electronic identification (IP address), and the network can respond to the passenger wireless device without further administrative overhead. The authentication process may include the use of security processes, such as a password, scan of a passenger immutable characteristic (fingerprint, retina scan, etc.), and the like.

Once the passenger wireless device is logged in, the passenger can access the free standard electronic services that are available from the network or customized electronic services for the particular passenger. The screens that are presented to the passenger can be customized to present the branding of the airline on which the passenger is traveling.

Individual IP Addresses for Passenger Wireless Devices Onboard an Aircraft

For forward traffic from the ground-based Access Network to a passenger wireless device on the aircraft, the Packet Data Serving Node (PDSN) maps a packet's destination IP address to an Air-To-Ground Modem that is located onboard the aircraft. However, the standard Packet Data Serving Node (PDSN) only supports a handful of IP addresses per Air-To-Ground Modem; and there are not enough IP addresses to be able to assign one per passenger wireless device located onboard the aircraft. The Network Address Translation (NAT) onboard the aircraft allows the Packet Data Serving Node (PDSN) to route data communications to multiple users using a single address for the aircraft, but in doing so, the Network Address Translation (NAT) hides the user addresses from the serving Packet Data Serving Node (PDSN) as well as the Network Operations Center (NOC) which is located on the ground. This makes the following functions difficult/impossible to implement in the Access Network:

1. Per-user, bandwidth shaping (e.g., limit P2P traffic).
2. Per-user, forward access control.
3. Transmission Control Protocol (TCP) optimization.

Therefore, the Access Network needs to be able to differentiate data streams that are received from and transmitted via the Air-To-Ground Modem(s) to the individual passenger wireless devices which are located onboard the aircraft. The way to do this is by making the user IP addresses visible on the ground to the Access Network, which implies that the IP addresses assigned to passenger wireless devices should be globally unique within the Airborne Wireless Cellular Network. To accomplish this, the Aircraft ID can be made part of a "subnet" for the IP address assigned via aircraft Dynamic Host Configuration Protocol (DHCP), which is a protocol used by networked devices (clients) to obtain various parameters necessary for the clients to operate in an Internet Protocol (IP) network. By using this protocol, system administration workload greatly decreases; and devices can be added to the network with minimal or no manual configurations. This makes it easier for the Network Operations Center (NOC) to map a user's IP address to an aircraft.

When a Dynamic Host Configuration Protocol (DHCP)-configured client (such as the aircraft-based Air-To-Ground Modem) connects to a network, its Dynamic Host Configuration Protocol (DHCP) client sends a broadcast query requesting necessary information from the serving Dynamic Host Configuration Protocol (DHCP) server. The Dynamic Host Configuration Protocol (DHCP) server manages a pool of IP addresses and information about client configuration parameters such as the default gateway, the domain name, the DNS servers, other servers such as time servers, and so forth. Dynamic Host Configuration Protocol (DHCP) provides a mechanism for allocating IP addresses wherein the Network Operations Center (NOC) assigns a range of IP addresses to the aircraft-based Dynamic Host Configuration Protocol (DHCP) server. The request-and-grant process of this protocol uses a lease concept with a controllable time period, allowing the Dynamic Host Configuration Protocol (DHCP) server to reclaim (and then reallocate) IP addresses that are not renewed (dynamic re-use of IP addresses).

NAT IP Tunnel Example

Figure 3A:
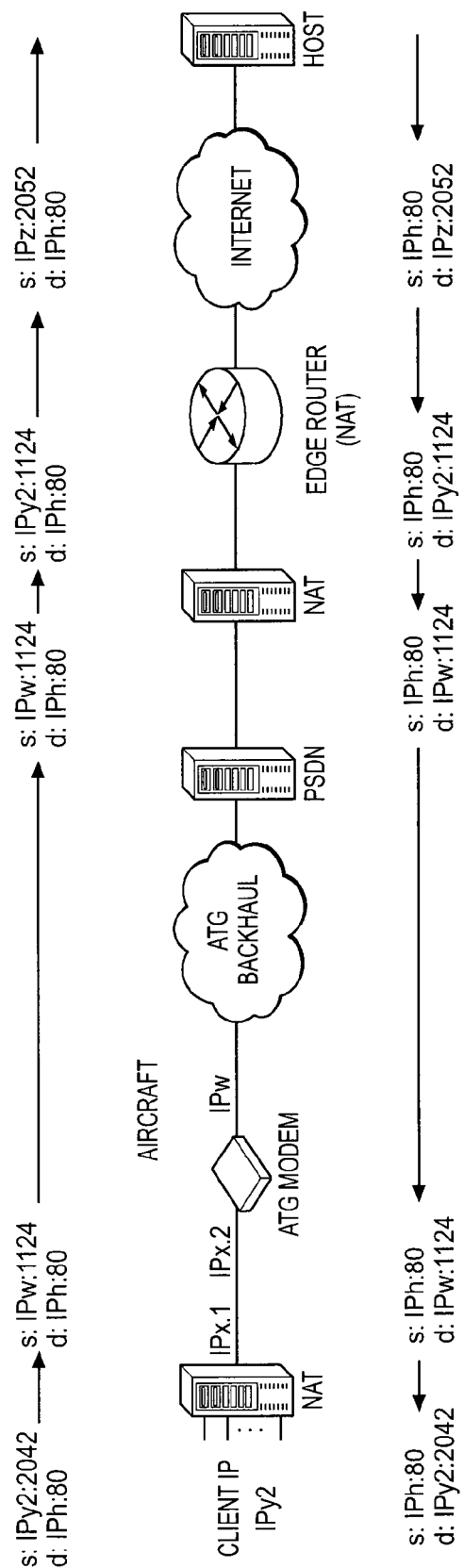
FIG. 3A illustrates, in signal flow diagram form.
Figure 3B:
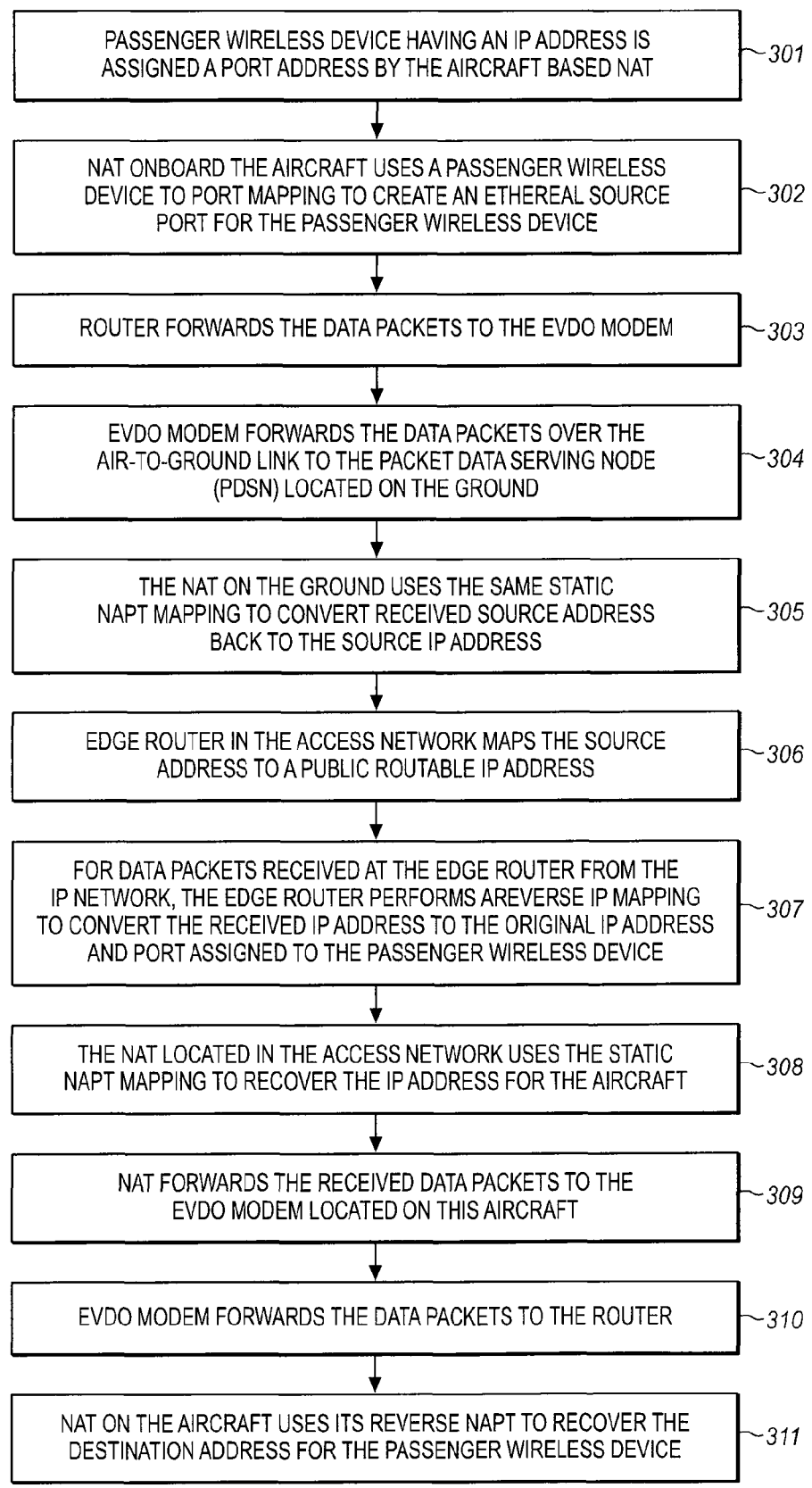
FIG. 3B illustrates, in flow diagram form, the typical operation of the Traffic Scheduling System using an IP Tunnel.

FIG. 3A illustrates, in signal flow diagram form, and FIG. 3B illustrates, in flow diagram form, the typical operation of the Traffic Scheduling System using a NAT IP Tunnel to exchange data with a specific destination. This example illustrates a selected passenger wireless device having an IP address of IPy.2 communicating with an end point (not shown) that has an IP address of IPh:80. The passenger wireless device is assigned a port address, such as 2042, at step 801 by the NAT located onboard the aircraft, which port address is appended to the passenger wireless device IP address to yield IPy2:2042, which is a private, globally unique, dynamic IP address for this passenger wireless device located in the particular aircraft (w). The NAT onboard the aircraft at step 802, therefore, uses this passenger wireless device to port mapping to create an ethereal source port for the passenger wireless device IP address IPy.2. The source address, therefore, is IPy2:2042 and the destination address is IPh:80.

The Router is assigned an IP address of IPx.1, and the Air-To-Ground Modem is assigned an IP address of IPx.2, where these IPx.* addresses are private, locally unique, static IP addresses. The Air-To-Ground Modem is the NAT Tunnel endpoint on the aircraft, identified by an IPw.* IP address, and the IPw.* IP addresses are private, globally unique, static IP addresses assigned by the Packet Data Serving Node (PDSN). For data packet traffic generated by the passenger wireless devices, the NAT on the aircraft uses a static NAPT to map the passenger wireless device IPy.z.* IP address to an IPw.x IP address and an ethereal source port (from a range of ports assigned to that aircraft) that is unique for the particular passenger wireless device IPy.z.* Thus, the Router selects an IP address assigned by the Packet Data Serving Node (PDSN) and assigns an IP address of IPw:1124 to this source passenger wireless device.

The data packet then is tunneled to the Air-To-Ground Modem by the Router at step 803 over the IPx.* network and then is forwarded at step 804 by the Air-To-Ground Modem over the Air-To-Ground link to the Packet Data Serving Node (PDSN) located on the ground. The Packet Data Serving Node (PDSN) sees only a single IP address per aircraft as is expected, and the NAT on the ground uses the same static NAPT mapping at step 805 to convert IPw.x and source port from the aircraft back to the IPy IP address. The ethereal source port received from the aircraft remains the same. Thus, at the NAT, the source address for the passenger wireless device becomes IPy2:1124, since the source port address does not change. The Edge Router in the Access Network maps the source address to a public routable IP address IP2:2052 at step 806 and selects any available ethereal source port.

In the reverse direction, data packets received at the Edge Router from the IP Network from the destination (now termed source IPh:80 in this direction of the bidirectional communication connection) are directed at step 807 to destination IP2:2052, and the Edge Router performs a reverse IP mapping to convert the received IP address to the original IP address and port assigned to the passenger wireless device to yield IPy2:1124. The NAT located in the Access Network uses the static NAPT mapping at step 808 to recover the IPw for the aircraft in which this passenger wireless device resides. The destination port remains the same, and the IP address output by the NAT, therefore, is IPw:1124. The NAT located in the Access Network at step 809 forwards the received data packets to the Air-To-Ground Modem located onboard this aircraft. The received data packets are received at the Air-To-Ground Modem located on this aircraft and are forwarded at step 810 to the Router, where the NAT on the aircraft at step 811 uses its reverse NAPT to recover the destination address IPy2 and port 2042 for the passenger wireless device.

In this manner, the address manipulation used in the aircraft and in the Access Network enables the Packet Data Serving Node (PDSN) to present unique IP addresses to the ground-based network for the plurality of passenger wireless devices located on the aircraft, yet use the standard common IP address for the Air-To-Ground link.

Signaling Details of Point-to-Point Protocol Session Establishment

Figure 4:
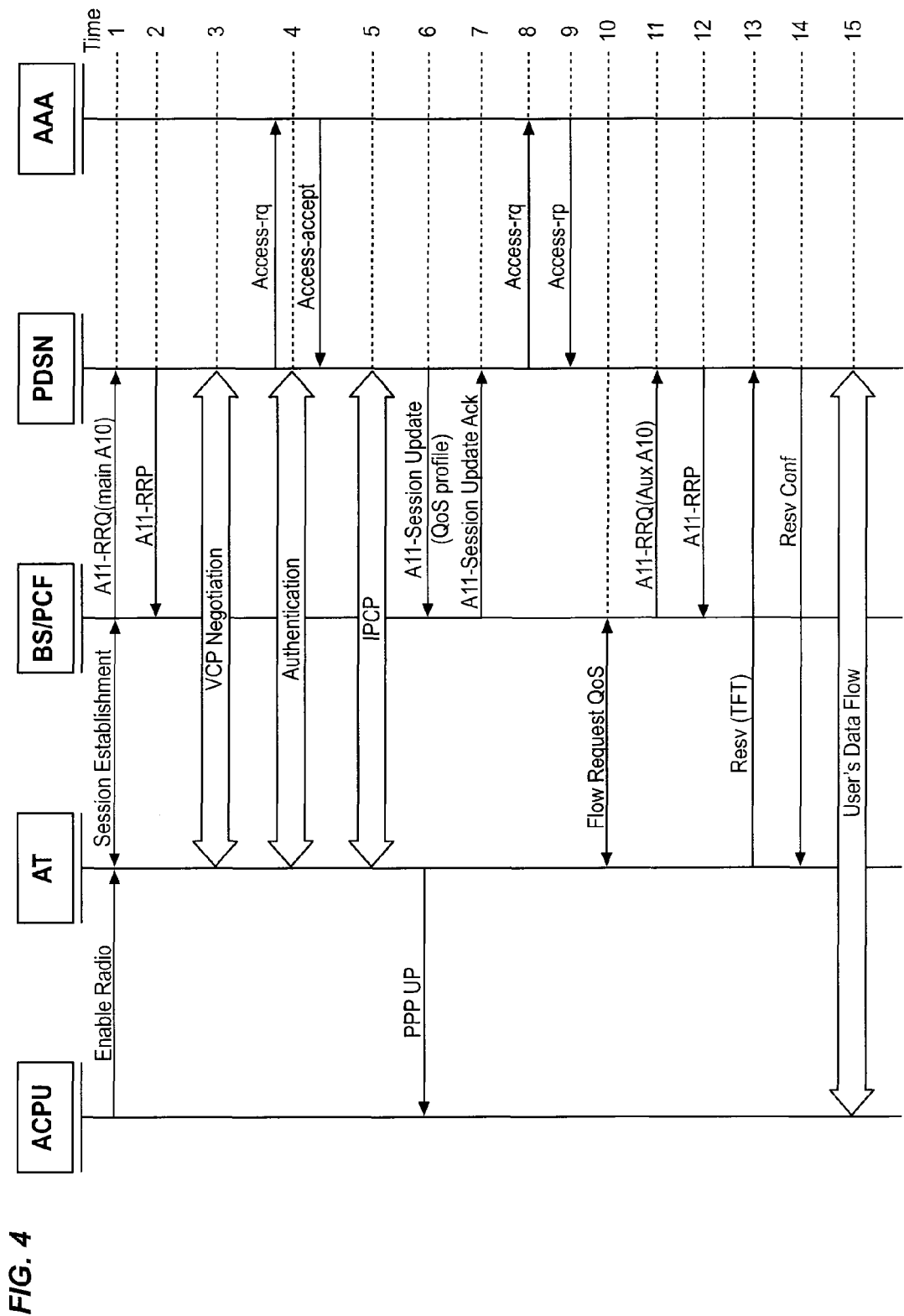
FIG. 4 illustrates the signal flow in a typical Point-To-Point Protocol Session Establishment process.
Figure 5:
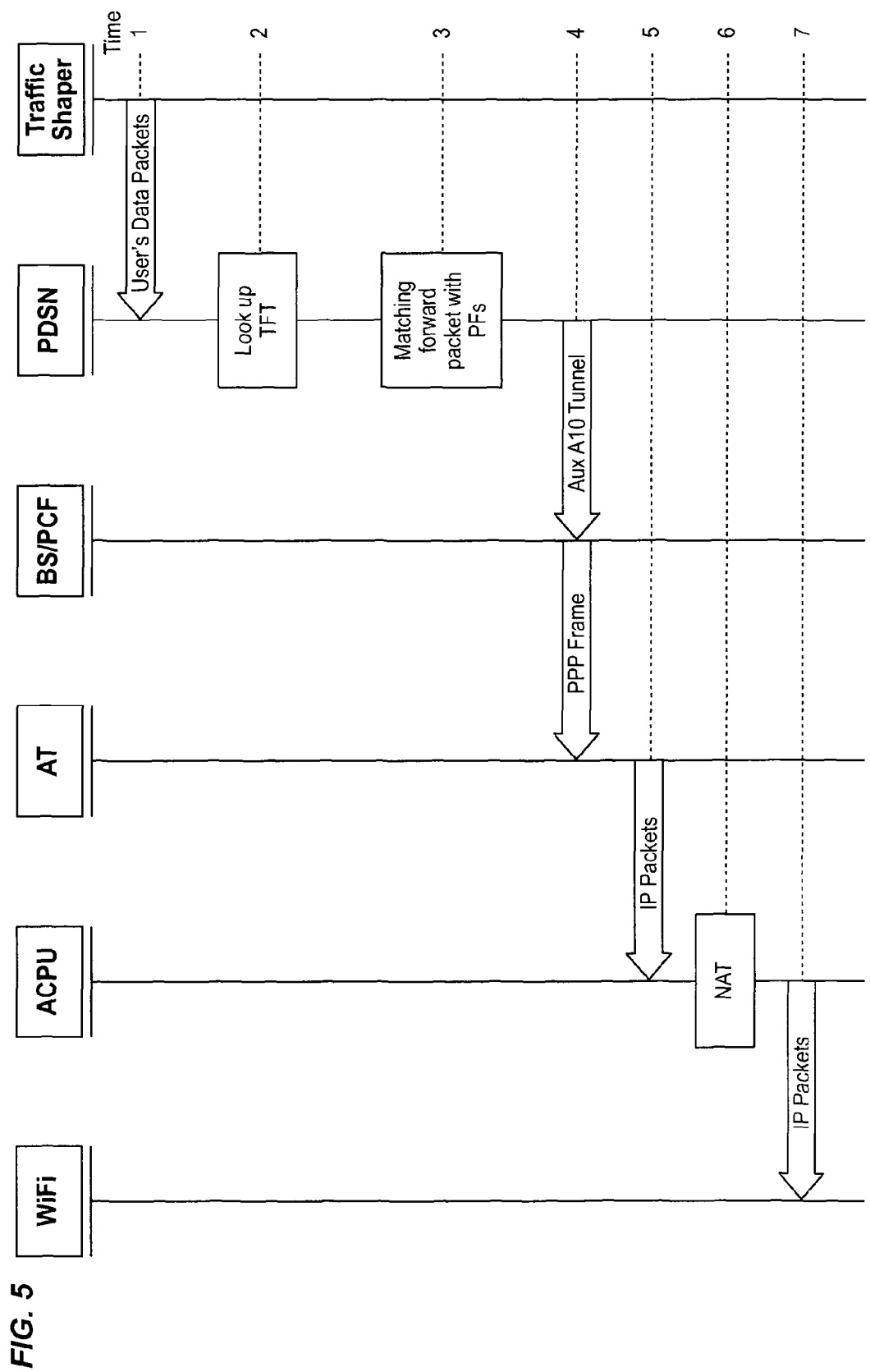
FIG. 5 illustrates the signal flow in a typical Forward Flow of an established connection.

FIG. 4 illustrates the signal flow in a typical Point-To-Point Protocol Session Establishment process which is executed between the aircraft and the ground-based communication system over the Air-To-Ground link, and FIG. 5 illustrates the signal flow in a typical Forward Flow of an established connection over the Air-To-Ground link. The following signal flows are shown in FIG. 4:

1. The Airborne Control Processor Unit (ACPU) 122 notifies the Air-To-Ground Airborne Communications Unit (AACU) 123 to enable its radio frequency transceiver to establish a data connection.
2. The Air-To-Ground Airborne Communications Unit (AACU) 123 establishes a session with Base Station Controller 140, and Packet Control Function 143 initiates A11 registration request to Public Switched Data Network 143 to establish the main A10 tunnel for this aircraft.
3. Public Switched Data Network 143 establishes the main A10 tunnel by returning an A11-Registration Reply message to the Base Station Controller 140 with an accept indication and Lifetime set to a non-zero value.
4. The Air-To-Ground Airborne Communications Unit (AACU) 123 initiates LCP negotiation with Public Switched Data Network 143.
5. The Air-To-Ground Airborne Communications Unit (AACU) 123 is authenticated by Authentication, Authorization, and Accounting (AAA) server 145. Authorization information of the Airborne Terminal is stored by Public Switched Data Network 143.
6. Public Switched Data Network 143 assigns the first IP address of a pre-specified IP Network to the Air-To-Ground Airborne Communications Unit (AACU) 123 in Internet Protocol Control Protocol (IPCP):

For example, the IP address subnet is based on the Air-To-Ground Airborne Communications Unit (AACU) 123 Network Address Identifier (NAI), e.g. the Air-To-Ground Airborne Communications Unit 123 receives IP address 192.168.1.1 from Sub-network 192.168.1.0/24.

The Sub-network size (/24, /23, etc.) and Network Address Identifier Sub-network mapping is defined on the Air-To-Ground Airborne Communications Unit (AACU) 123 and Public Switched Data Network 143 prior to first call; thus, the IP Sub-network assignment is "Implicitly Assigned".

There is no change in Internet Protocol Control Protocol (IPCP) messaging or structure.

The Air-To-Ground Airborne Communications Unit (AACU) 123 can utilize the Sub-network pool of addresses in any way; the Public Switched Data Network 143 Point-to-Point Protocol/Traffic Flow Template forwarding logic (Forward Link) must allow for the Sub-network of addresses to be associated with the single Point-to-Point Protocol link (negotiation).

7. After the Air-To-Ground Airborne Communications Unit (AACU) 123 finishes establishing Point-to-Point Protocol session, the Air-To-Ground Airborne Communications Unit (AACU) 123 notifies Airborne Control Processor Unit (ACPU) 122. At the same time, Public Switched Data Network 143 sends A11 session update to Packet Control Function 143 for notifying the user's QoS profile to Base Station Controller 140.

8. Base Station Controller 140 sends acknowledgement to Public Switched Data Network 143.

9. Upon establishment of the Point-to-Point Protocol session, Public Switched Data Network 143 sends accounting request to Authentication, Authorization, and Accounting (AAA) server 145.

10. Authentication, Authorization, and Accounting (AAA) server 145 stores user's accounting packets and sends accounting replies to Public Switched Data Network 143.

11. Air-To-Ground Airborne Communications Unit (AACU) 123 sends QoS request message to Base Station Controller 140. Base Station Controller 140 reserves QoS resource for Air-To-Ground Airborne Communications Unit (AACU) 123.

12. Packet Control Function sends A11 registration request to Public Switched Data Network 143 to establish auxiliary A10 tunnel.

13. Public Switched Data Network 143 establishes auxiliary A10 tunnel.

14. Air-To-Ground Airborne Communications Unit (AACU) 123 sends RESV message to Public Switched Data Network 143 to provide the Public Switched Data Network 143 with Traffic Flow Template for the data flow of users. The Packet Filter in Traffic Flow Template takes the Differentiated Services Code Point (DSCP) filter component and the Flow ID.

15. Public Switched Data Network 143 stores Packet Filters of Traffic Flow Template and replies to Air-To-Ground Airborne Communications Unit (AACU) 123.

16. User begins to transmit data flow.

Forward Flow

FIG. 5 illustrates the signal flow in a typical Forward Flow of an established connection over the Air-To-Ground link, as follows:

1. The Traffic Scheduling System 124 sends user's data packets received from the Air-To-Ground Airborne Communications Unit (AACU) 123 to the Packet Data Serving Node 143.

2. Packet Data Serving Node 143 retrieves the Traffic Flow Template associated with the user's terminal device 101 according to the destination IP address of data packet. The Destination IP address is a single address within the IP Pool (Subnet) assigned to that Point-to-Point Protocol link.

3. The Packet Data Serving Node 143 applies Packet Filter (PF) which is defined in the Traffic Flow Template to match the ToS in the IP header of the packet received from the user's terminal device 101. The Packet Filter includes Differentiated Services Code Point (DSCP) value as filter components.

4. Once the Packet Data Serving Node 143 matches the packets successfully, the Packet Data Serving Node 143 reads the Flow ID from the matched Packet Filter and finds the appropriate A10 tunnel bearing the Flow ID. The Packet Data Serving Node 143 then encapsulates the user's data into the specified A10 tunnels. Packet Data Serving Node 143 sends the packets to Base Station Subsystem/PCF, and Base Station Subsystem/PCF sends user data to Air-To-Ground Airborne Communications Unit (AACU) 123 by wireless interface.

5. When Air-To-Ground Airborne Communications Unit (AACU) 123 receives Point-to-Point Protocol frame, Air-To-Ground Airborne Communications Unit (AACU) 123 decapsulates the Point-to-Point Protocol frame to get user's IP packets and sends packets of user to Airborne Control Processor Unit (ACPU) 122.

6. Airborne Control Processor Unit (ACPU) 122 makes the Network Address Translation for IP header of packets of user 7. After Network Address Translation, Airborne Control Processor Unit (ACPU) 122 sends the received and translated packets to the WiFi subsystem 113/114.

Traffic Shaping

Traffic shaping (also known as "packet shaping") is an attempt to control computer network traffic in order to optimize or guarantee performance, low latency, and/or bandwidth by delaying packets. More specifically, traffic shaping is any action on a set of packets (often called a stream or a flow) which imposes additional delay on those packets such that they conform to some predetermined constraint (a contract or traffic profile). Traffic shaping provides a means to control the volume of traffic being sent into a network in a specified period (bandwidth throttling), or the maximum rate at which the traffic is sent (rate limiting), or more complex criteria such as Generic Cell Rate Algorithm (or GCRA), which is an algorithm which measures cell rate at a specified timescale. The Generic Cell Rate Algorithm is an implementation of the leaky bucket algorithm in ATM networks and provides a traffic shaping function. Traffic shaping is achieved by delaying packets and is commonly applied at the network edges to control traffic entering the network; but it can also be applied by the traffic source (for example, computer or network card) or by an element in the network.

Traffic Scheduling System

Figure 10:
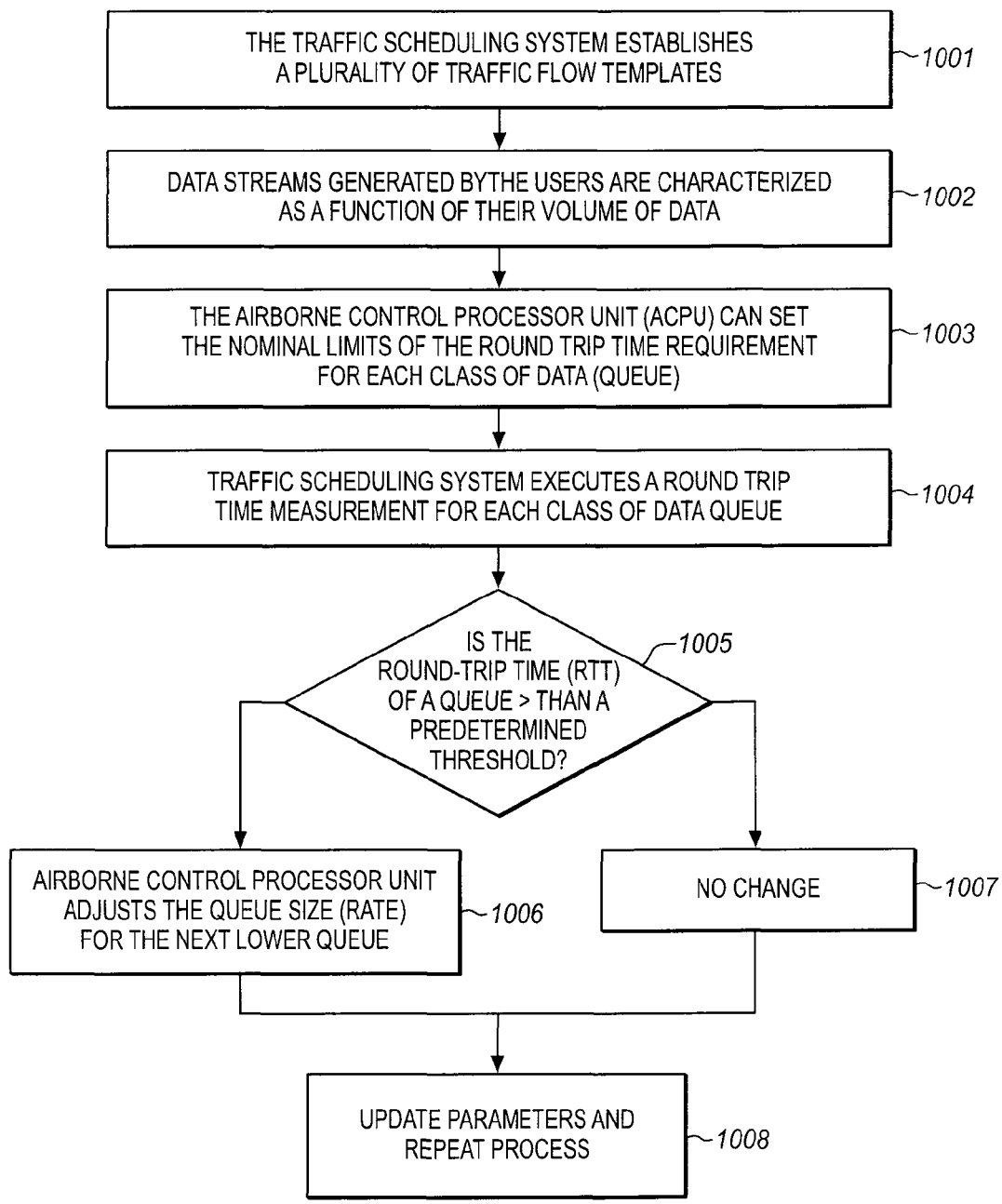
FIG. 10 illustrates, in flow diagram form, the operation of the Traffic Scheduling System to regulate the delivery of Bandwidth Intensive traffic.

FIG. 10 illustrates, in flow diagram form, the operation of the Traffic Scheduling System to regulate the delivery of Bandwidth Intensive traffic. The Airborne Control Processor Unit (ACPU) 122 includes a Traffic Scheduling System 124 which can negotiate the flow of data on the Air-To-Ground link which can be served by multiple modems. The Traffic Scheduling System 124 at step 1001 establishes a plurality of Traffic Flow Templates, each of which defines a flow at and to the Packet Data Serving Node 143. The Packet Data Serving Node 143 applies a Packet Filter (PF) which is defined in the Traffic Flow Template to match the ToS in the IP header of the packet received from the user's terminal device 101. The Packet Filter includes Differentiated Services Code Point (DSCP) value as filter components which assign subscribers to selected flows. Since the Airborne Control Processor Unit (ACPU) 122 knows how many users/active subscribers/authenticated subscribers are present, it can manage the assignment of streams to the appropriate Traffic Flow Template.

For example, there can be a committed information flow rate, such as % lost packets/latency, which is managed using 5 flows/queues to manage the various classes of data:
1. Fixed Bandwidth—alarms/VoIP/FAM (expedited real time data flows)
2. Passenger data—near real time data flows (HTTP)
3. Passenger data—non-real time (Virtual Private Network, E-Mail)—best efforts
4. Bandwidth intensive (Video)
5. Administrative (logs, software updates)

The number of Traffic Flow Templates used to implement these classes of data and/or other classes of data can be negotiated as a function of the number of subscribers, the type of service requested, and/or the service subscription authorized for each subscriber. The number of subscribers determines the committed information flow rate, and the Packet Data Serving Node 143 can change the Bandwidth of the Air-To-Ground link to the plane.

Bandwidth Intensive Traffic Identification Based on Transport Stream

In order to effect the traffic management of the data in a simple manner, the data streams generated by the users are characterized at step 1002 as a function of their volume of data. A stream is a layer 4 connection between the client and an Internet server over the Air-To-Ground link. For example, a typical Internet browsing stream has a relatively short "lifetime" (minutes) and passes relatively little data (few Kbyte). Therefore, streams that pass large amounts of data are identified as bandwidth intensive and should be prioritized differently than smaller streams. For example, one simple binary metric can be:

Small Streams: (js, css, gif, etc. types of files) Size~<200 kbyte
Large Streams: (swf, fly, etc. types of files) Size>200 kbyte The number of data stream classifications is determined by the system administration needs and can even vary as a function of the data traffic.

Large byte-volume streams are the root of congestion on the Air-To-Ground Link, and the Traffic Scheduling System 124 can classify and prioritize streams based on their byte volume. FIGS. 6 and 7 illustrate screen shots of typical data file transfer activity as monitored by the Traffic Scheduling System 124. In an HTTP environment, the source socket provides object size information to the destination, such as the information shown in FIGS. 6 and 7. From these displays of data stream activity, it is evident that the large file sizes (>25 MB) represent video streams, especially when the file is associated with the identification of the destination port (youtube.com). Thus, the stream classification can incorporate a number of factors in making a determination of bandwidth intensive stream, including TCP/UDP, number of packets (VoIP), file size, cumulative traffic, and well-known port combinations. For example, certain ports are inherently the source of bandwidth intensive traffic; and even if the source divides the file into multiple streams, the source and destination addresses are identical for all the streams, and these streams can be added together for the purpose of making a Bandwidth Intensive determination. This classification of traffic is "network neutral"—all data is classified at a stream level (source IP, destination IP, source port, destination port). Otherwise, the data is not inspected. A stream is deemed "Bandwidth Intensive" if it exceeds some byte volume, which can be a lifetime count, or a "leaky bucket" mechanism or the factors noted above.

Bandwidth Intensive Controller

Once streams have been classified by the Traffic Scheduling System 124, the Bandwidth Intensive and Near Real Time traffic can be controlled by a simple Traffic Shaping process executed by the Traffic Scheduling System 124, using a traffic management parameter such as via the Round-Trip Time of the next higher priority queue, in the set of queues as outlined above. In telecommunications, the term "round-trip delay time" or Round-Trip Time (RTT) is the elapsed time for transit of a signal over a closed circuit or time elapsed for a message. Another definition for Round-Trip Time is the time required for a signal pulse or packet to travel from a specific source to a specific destination and back again.

The Airborne Control Processor Unit (ACPU) 122 can set the nominal limits of the Round-Trip Time requirement for each class of data (queue) at step 1003. Thus, at step 1004, the Traffic Scheduling System 124 computes the Round-Trip Time for each class of data queue. This measurement typically is taken across the Air-To-Ground link and may extend further into the communication network if so desired to measure the time it takes to traverse a predetermined portion of the network. The Round-Trip Time can be measured by inserting a GPS-determined time stamp into the header of the message thereby to obtain precise time measurements used to compute the Round-Trip Time, or the initial query simply can be returned and the transit time measured. The Round-Trip Time (RTT) of the highest priority queue is compared to a predetermined threshold at step 1005 and if it is greater than this threshold, then the Airborne Control Processor Unit (ACPU) 122 at step 1006 can implement a Dynamic Configuration of the system by reducing the queue size (rate) for the next lower queue. The lower priority queues in turn can borrow from higher priority classes if the Round-Trip Time (RTT) supports this adjustment. This queue design allows for variable link conditions, and the queue size/rate can be adjusted based upon known Air-To-Ground link conditions and client loading (provide more bandwidth to endpoints with more active clients). If the determination at step 1005 is that the Round-Trip Time does not exceed the threshold, then nothing is done at step 1007 and the process at step 1008 updates the parameters and the rate setting process is repeated.

The Airborne Control Processor Unit (ACPU) 122 can Measure Real Time, Near Real Time, and Round-Trip Time via TCP/ICMP/RTP methods. In addition, the Airborne Control Processor Unit (ACPU) 122 can place a proprietary HTTP header tag in client data to define additional traffic management data, so the message becomes self-defining:
Flight identification data (Aircraft tail number)
Aircraft GPS data
System loading
Session id (uname)
RTT, etc.

Figure 8:
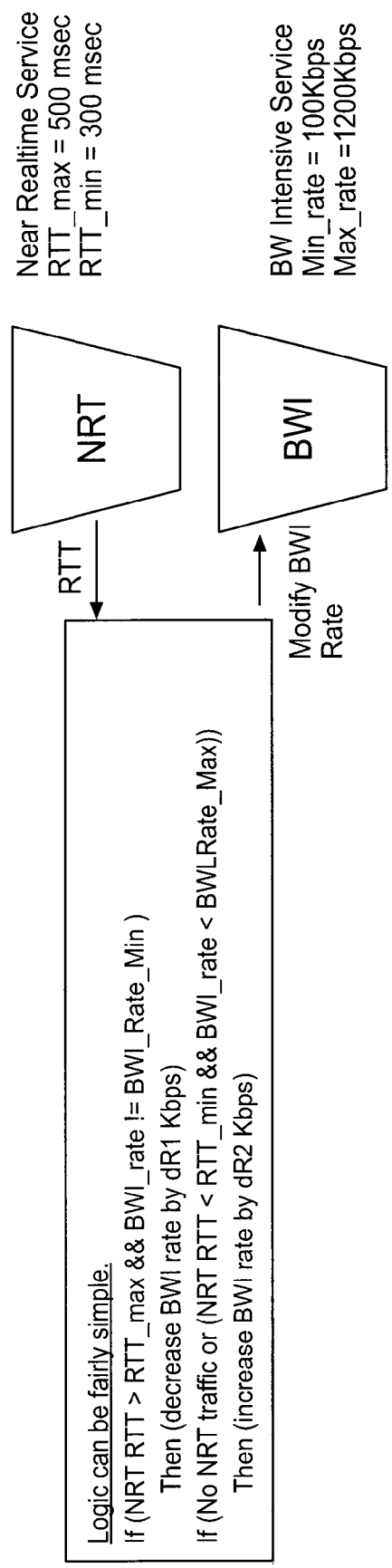
FIG. 8 illustrates in flow diagram form the operation of the Traffic Scheduling System to regulate the delivery of Bandwidth Intensive traffic, based upon the present state of the Non-Real Time traffic performance.
Figure 9:
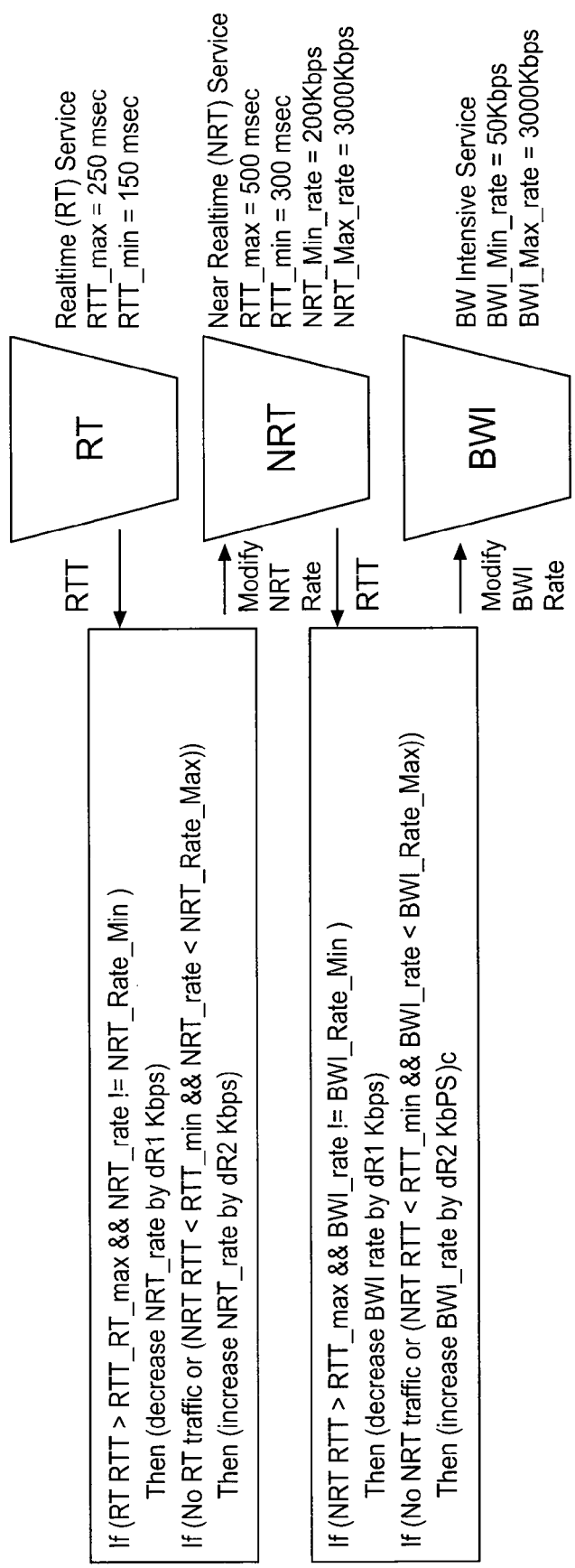
FIG. 9 illustrates, in flow diagram form, the operation of the Traffic Scheduling System to determine a delivery rate of Bandwidth Intensive traffic, based upon the present state of the Real Time and Non-Real Time traffic performance.

FIG. 8 illustrates, in flow diagram form, the operation of the Traffic Scheduling System to regulate the delivery of Bandwidth Intensive traffic, based upon the present state of the Non-Real Time traffic performance; and FIG. 9 illustrates, in flow diagram form, the operation of the Traffic Scheduling System to determine a delivery rate of Bandwidth Intensive traffic, based upon the present state of the Real Time and Non-Real Time traffic performance. In particular, Traffic Scheduling System 124 is located in Airborne Control Processor Unit (ACPU) 122, which places the Traffic Scheduling System 124 in a highly distributed mode, where the data stream information is generated closer to the Airborne Control Processor Unit (ACPU) 122, which can adjust the controls and methods via Aircraft Network Controller Dynamic Configuration.

The implementation of FIG. 8 illustrates, in flow diagram form, the operation of the Traffic Scheduling System 124 to regulate the delivery of Bandwidth Intensive traffic, based upon the present state of the Non-Real Time traffic performance. This diagram illustrates the use of two queues, one for Non-Real Time (NRT) traffic and one for Bandwidth Intensive (BWI) traffic. The typical metrics for these services (which can be adjusted as needed) are the Round-Trip Time (RTT) for traffic for the Non-Real Time (NRT) is between 300 msec and 500 msec. Similarly, the Bandwidth Intensive service has a data transfer rate of between 100 Kbps and 1200 Kbps. These operational guidelines represent the outer limits of the queue operation. The algorithm for adjusting the queue size to remain within these limits is:

IF (the Round-Trip Time (RTT) for Non-Real Time (NRT) queue>the maximum allowable Round-Trip Time (RTT)+the present data transmission rate for Bandwidth Intensive (BWI) traffic is less than or=the minimum rate for Bandwidth Intensive (BWI) traffic)
    THEN (decrease the Bandwidth Intensive (ma) traffic rate by $\Delta_{BWD}$ Kbps).
    IF ((there is no Non-Real Time (NRT) traffic) OR (the Round-Trip Time (RTT) for Non-Real Time (NRT) queue<the minimum allowable Round-Trip Time (RTT)+the present data transmission rate for Bandwidth Intensive (BWI) traffic is less than the maximum rate for Bandwidth Intensive (BWI) traffic))
    THEN (increase the Bandwidth Intensive (BWI) traffic rate by $\Delta_{BWI}$ Kbps).

The implementation of FIG. 9 illustrates, in flow diagram form, the operation of the Traffic Scheduling System 124 to determine a delivery rate of Bandwidth Intensive traffic, based upon the present state of the Real Time and Non-Real Time traffic performance. This diagram illustrates the use of three queues, one for Real Time (RT) traffic, one for Non-Real Time (NRT) traffic, and one for Bandwidth Intensive (ma) traffic. The typical metrics for these services (which can be adjusted as needed) are the Round-Trip Time (RTT) for traffic for the Real Time (RT) is between 150 msec and 250 msec.; the Round-Trip Time (RTT) for traffic for the Non-Real Time (NRT) is between 300 msec and 500 msec, and the data transfer rate is between 200 Kbps and 3000 Kbps. Similarly, the Bandwidth Intensive service has a data transfer rate of between 50 Kbps and 3000 Kbps. These operational guidelines represent the outer limits of the queue operation. The algorithm for adjusting the queue size to remain within these limits is:

IF (the Round-Trip Time (RTT) for Real Time (RT) queue>the maximum allowable Round-Trip Time (RTT)+the present data transmission rate for Non-Real Time (NRT) traffic is less than or=the minimum rate for Non Real Time (NRT) traffic)
    THEN (decrease the Non-Real Time (NRT) traffic rate by $\Delta_{NRTD}$ Kbps).
    IF ((there is no Real Time (RT) traffic) OR (the Round-Trip Time (RTT) for Non-Real Time (NRT) queue<the minimum allowable Round-Trip Time (RTT)+the present data transmission rate for Non-Real Time (NRT) traffic is less than the maximum rate for Non-Real Time (NRT) traffic))
    THEN (increase the Non-Real Time (NRT) traffic rate by $\Delta_{NRTI}$ Kbps).
    IF (the Round-Trip Time (RTT) for Non-Real Time (NRT) queue>the maximum allowable Round-Trip Time (RTT)+the present data transmission rate for Bandwidth Intensive (BWI) traffic is less than or=the minimum rate for Bandwidth Intensive (BWI) traffic)
    THEN (decrease the Bandwidth Intensive (BWI) traffic rate by $\Delta_{BWD}$ Kbps).
    IF ((there is no Non-Real Time (NRT) traffic) OR (the Round-Trip Time (RTT) for Non-Real Time (NRT) queue<the minimum allowable Round-Trip Time (RTT)+the present data transmission rate for Bandwidth Intensive (BWI) traffic is less than the maximum rate for Bandwidth Intensive (BWI) traffic))
    THEN (increase the Bandwidth Intensive (BWI) traffic rate by $\Delta_{BWI}$ Kbps).

SUMMARY

The Traffic Scheduling System executes a multi-step process first to identify the bandwidth intensive traffic. The identification of the bandwidth intensive traffic is effected at the stream level by measuring the byte volume of the stream and using this data to classify the stream into one of a plurality of usage categories. The classification of bandwidth intensive traffic extant in the aircraft is network neutral in that all data is classified at the stream level (source IP, destination IP, source port, destination port). Otherwise, the data is not inspected. The stream is deemed Bandwidth Intensive if it exceeds some byte volume, and the streams deemed Bandwidth Intensive then are controlled at the Aircraft Network Controller using Dynamic Configuration.

What is claimed as new and desired to be protected by Letters Patent of the United States is:

1. A system for classifying and scheduling traffic generated by a plurality of devices to reduce congestion on a communication link which connects the plurality of devices with destinations, comprising:
    a traffic volume monitor for measuring the byte volume of stream of traffic between a device and an IP destination over a defined time interval;
    a bandwidth intensive traffic identifier for identifying a stream of traffic which is passing data in excess of a predetermined threshold; and
    a traffic controller for regulating processing of said identified stream of traffic to reduce the volume of traffic presented to the communication link.

2. The system for classifying and scheduling traffic of claim 1 wherein said bandwidth intensive traffic identifier further comprises:
    a queue manager for establishing a plurality of concurrently active queues, each indicative of a usage category, to manage traffic assigned to each of said plurality of queues; and
    a queue controller, responsive to said measured byte volume of a stream of traffic, for classifying the stream of traffic into one of the of usage categories and assignment into the corresponding queue.

3. The system for classifying and scheduling traffic of claim 2 wherein said queue controller comprises:
    a bandwidth intensive traffic comparator for classifying all data streams at the stream level (source IP, destination IP, source port, destination port) absent inspection of content of said data stream.

4. The system for classifying and scheduling traffic of claim 2 wherein said queue manager creates queues based upon types of data streams selected from among the classes of data including: fixed bandwidth, near real time data, non-real time data, bandwidth intensive, and administrative.

5. The system for classifying and scheduling traffic of claim 2 wherein said traffic controller comprises:
    a traffic management parameter monitor for generating a measurement of Round-Trip Time of streams of traffic in a queue.

6. The system for classifying and scheduling traffic of claim 5 wherein said traffic controller further comprises:
   a traffic quality monitor for determining if said measured Round-Trip Time of streams of traffic in said queue is within a predetermined range.

7. The system for classifying and scheduling traffic of claim 6 wherein said traffic controller further comprises:
   a queue adjustor, responsive to said determination of whether said measured Round-Trip Time of streams of traffic in said queue is within a predetermined range, for setting a predetermined range of data transfer rates for the next lower priority queue.

8. The system for classifying and scheduling traffic of claim 6 wherein said traffic controller further comprises:
   a queue adjustor, responsive to said determination of whether said measured Round-Trip Time of streams of traffic in said queue is within a predetermined range, for setting a queue size for the next lower priority queue.

9. The system for classifying and scheduling traffic of claim 6 wherein said traffic controller further comprises:
   a queue adjustor, responsive to at least one of variable link conditions and number of devices, for adjusting the queue size/rate of the queues.

10. A method of operating a system for classifying and scheduling traffic generated by a plurality of devices to reduce congestion on the communication link which connects the plurality of devices with destinations, comprising:
   measuring the byte volume of a stream of traffic between a device and an IP destination over a defined time interval;
   identifying a stream of traffic, associated with one of the plurality devices, which is passing data in excess of a predetermined threshold; and
   delaying the processing of said identified stream of traffic to reduce the volume of traffic presented to the communication link.

11. The method of operating a system for classifying and scheduling traffic of claim 10 wherein said step of identifying further comprises:
   establishing a plurality of concurrently active queues to manage traffic assigned to each of said plurality of queues; and
   classifying, in response to said measured byte volume of a stream of traffic, the stream of traffic into one of the usage categories and assignment into the corresponding queue.

12. The method of operating a system for classifying and scheduling traffic of claim 11 wherein said step of classifying comprises:
   classifying all data streams at the stream level (source IP, destination IP, source port, destination port) absent inspection of content of said data stream.

13. The method of operating a system for classifying and scheduling traffic of claim 11 wherein said step of establishing creates queues based upon types of data streams selected from among the classes of data including: fixed bandwidth, near real time data, non-real time data, bandwidth intensive, and administrative.

14. The method of operating a system for classifying and scheduling traffic of claim 10 wherein said step of regulating comprises:
   a traffic management parameter monitor for generating a measurement of Round-Trip Time of streams of traffic in a queue.

15. The method of operating a system for classifying and scheduling traffic of claim 10 wherein said step of regulating further comprises:
   determining if said measured Round-Trip Time of streams of traffic in said queue is within a predetermined range.

16. The method of operating a system for classifying and scheduling traffic of claim 15 wherein said step of regulating further comprises:
   setting, in response to said determination of whether said measured Round-Trip Time of streams of traffic in said queue is within a predetermined range, a predetermined range of data transfer rates for the next lower priority queue.

17. The method of operating a system for classifying and scheduling traffic of claim 15 wherein said step of regulating further comprises: setting, in response to said determination of whether said measured Round-Trip Time of streams of traffic in said queue is within a predetermined range, a queue size for the next lower priority queue.

18. The method of operating a system for classifying and scheduling traffic of claim 15 wherein said step of regulating further comprises: adjusting, in response to at least one of variable link conditions and number of devices, the queue size/rate of the queues.

\* \* \* \* \*